United States Patent
Natale et al.

(10) Patent No.: US 12,458,474 B2
(45) Date of Patent: Nov. 4, 2025

(54) PROCESS FOR MAKING A REINFORCING STRUCTURE FOR DENTAL PROSTHESES IN CONTINUOUS FIBER COMPOSITE MATERIALS

(71) Applicant: MOI DENTAL S.R.L., Milan (IT)

(72) Inventors: Gabriele Natale, Milan (IT); Michele Tonizzo, Milan (IT)

(73) Assignee: MOFDENTAL S.R.L., Milan (IT)

( * ) Notice: Subject to any disclaimer, the term of this patent is extended or adjusted under 35 U.S.C. 154(b) by 724 days.

(21) Appl. No.: 17/756,725

(22) PCT Filed: Dec. 1, 2020

(86) PCT No.: PCT/IB2020/061312
§ 371 (c)(1),
(2) Date: Jun. 1, 2022

(87) PCT Pub. No.: WO2021/111287
PCT Pub. Date: Jun. 10, 2021

(65) Prior Publication Data
US 2023/0011023 A1   Jan. 12, 2023

(30) Foreign Application Priority Data

Dec. 6, 2019   (IT) ..................... 102019000023226

(51) Int. Cl.
*A61C 13/00* (2006.01)
*A61C 13/34* (2006.01)
(Continued)

(52) U.S. Cl.
CPC .......... *A61C 13/0019* (2013.01); *A61C 13/34* (2013.01); *B29C 64/165* (2017.08);
(Continued)

(58) Field of Classification Search
CPC ............... A61C 13/0019; A61C 13/34; A61C 13/0004; A61C 13/0003; B29C 64/165;
(Continued)

(56) References Cited

U.S. PATENT DOCUMENTS 11,197,744 B1 * 12/2021 Raslambekov ......... G06T 17/30
11,399,922 B2 * 8/2022 Maneuf .................. B33Y 10/00
(Continued)

FOREIGN PATENT DOCUMENTS

WO   2019101967 A1   5/2019

OTHER PUBLICATIONS

International Search Report and Written Opinion issued in PCT application No. PCT/IB2020/061312, mailing date Feb. 2, 2021.

*Primary Examiner* — Matthew M Nelson

(57) ABSTRACT

A process for making a reinforcing structure (20) for dental prostheses in continuous fiber composite materials is described, comprising the steps of: —a) obtaining a digital three-dimensional model (2) of the patient's palate by means of a three-dimensional scan; —b) defining an operative outline (3;3') through an offset of at least one portion of said three-dimensional model (2); —c) obtaining a path for at least one height hi of said three-dimensional model, said path being arranged inside said operative outline (3:3'); —d) depositing a continuous filiform element according to said path (9).

16 Claims, 5 Drawing Sheets

(51) Int. Cl.
*B29C 64/165* (2017.01)
*B29C 64/386* (2017.01)
*B33Y 10/00* (2015.01)
*B33Y 50/00* (2015.01)
B29K 105/08 (2006.01)
B29L 31/00 (2006.01)
*B33Y 80/00* (2015.01)

(52) U.S. Cl.
CPC ............ *B29C 64/386* (2017.08); *B33Y 10/00* (2014.12); *B33Y 50/00* (2014.12); *B29K 2105/08* (2013.01); *B29L 2031/7536* (2013.01); *B33Y 80/00* (2014.12)

(58) Field of Classification Search
CPC ....... B29C 64/386; B33Y 10/00; B33Y 50/00; B33Y 80/00; B29K 2105/08; B29L 2031/7536
USPC ...................................................... 433/201.1
See application file for complete search history.

(56) References Cited

U.S. PATENT DOCUMENTS

| | | | |
|---|---|---|---|
| 11,877,902 B2* | 1/2024 | Fujii | A61C 13/10 |
| 2004/0224285 A1* | 11/2004 | Duray | A61C 5/70 264/16 |
| 2010/0233655 A1* | 9/2010 | Karim | A61C 13/0009 433/172 |
| 2017/0296311 A1* | 10/2017 | Ueno | A61C 13/0006 |
| 2020/0246117 A1* | 8/2020 | Maneuf | B33Y 10/00 |
| 2020/0375704 A1* | 12/2020 | Rabe | G05B 19/4099 |
| 2022/0133449 A1* | 5/2022 | Herting | A61C 13/1003 433/34 |
| 2023/0011023 A1* | 1/2023 | Natale | B29C 64/165 |

\* cited by examiner

PROCESS FOR MAKING A REINFORCING STRUCTURE FOR DENTAL PROSTHESES IN CONTINUOUS FIBER COMPOSITE MATERIALS

FIELD OF THE INVENTION

The present invention concerns the field of dental prostheses and, in particular, the field of reinforcements for dental prostheses made of composite materials.

In particular, the present invention refers to a process for producing a reinforcement for dental prostheses in continuous fiber composite materials.

KNOWN ART

Generally, the association, by adhesion or cohesion, of two or more components different in shape and chemical composition, which are insoluble in each other and separated by an interface, can be defined as "composite material" or simply "composite".

The composites generally consist of a continuous phase (named matrix) and a discontinuous phase (which is named reinforcement). The mechanical properties of the material (resistance and rigidity) are mainly entrusted to the discontinuous phase, whereas the task of transferring the external loads applied to the discontinuous phase is entrusted to the continuous phase. This transmission occurs by the effect of tangential stresses. Moreover, in addition to stabilizing the composite by compression, the matrix has the task of holding together and protecting the fibers and of shaping the piece.

Ultimately, a composite material is a multiphase material which can be created artificially and which is different from the constituents: depending on the principle of the combined actions, the optimization of a property is obtained by means of the careful and studied combination of two or more different materials.

Depending on the material of the matrix constituting the continuous phase, the composites are classified as a metal matrix, a ceramic matrix and a polymer matrix. The polymer matrix composite materials generally consist of synthetic fibers (for example carbon, nylon, aramid or glass) incorporated into a polymer matrix which surrounds, protects and binds the fibers. Typically, the fibers constitute about 50/60% by volume of a polymer matrix composite.

In turn, there are two subclasses of materials composing the polymer matrix within the polymer matrix category, these are: thermoplastic polymers and thermosetting polymers.

The thermoplastic polymers are a group of plastic materials which acquire malleability under the action of temperature. Subjected to the action of temperature, the thermoplastic polymers can be molded or shaped into finished objects and can, thus, return to being rigid structures once cooled. In fact, the viscosity decreases with the increasing of temperature, but also with the increasing of the shear rate and shear stress. This heating/cooling cycle can theoretically be repeated several times depending on the quality of the different plastic materials; in practice, it is possible to repeat the cycle for a limited number of times since too many heating cycles can degrade the polymers.

The thermosetting polymeric materials have a lattice molecular structure formed by covalent bonds. The thermosetting polymers are cross-linked by means of a process named "Curing," through which the resin undergoes a series of transformations in the fluid state, passing through a gelled or rubbery state until passing to the vitreous state. Some thermosetting resins are cross-linked by means of heat or through heat and pressure combined. In other cases, the chemical reaction can occur at room temperature (cold thermosets) by means of light radiation, evaporation of substances, activation by means of humidity and, finally, due to the forced mixing of two elements (generally resin and catalyst).

Although the thermosetting resin artifacts can soften by the effect of heat (Tg, glass transition temperature), the covalent bonds of the network prevent them from returning to the fluid state that existed prior to the crosslinking, in fact, if heating involves exceeding the degradation temperature, they decompose and carbonize. The thermosetting materials cannot thus be reheated and thus melted as occurs with thermoplastics.

In recent years, the composite materials, thanks to their mechanical characteristics and low cost, have also found applications in the orthodontic and prosthetic field, in particular in the making of reinforcements for dental prostheses.

Typically, in the orthodontic or prosthetic field, the composite materials are used to make reinforcing structures, i.e. a sort of skeleton or structure fixed to, preferably incorporated with, a base, which simulates the gums or a portion thereof, and to/with the elements composing the prosthesis. The resin, forming real teeth, is subsequently poured onto the reinforcing structure.

Generally, the reinforcements for prostheses in composite material are made by molding a block, always in composite material, from which the reinforcement is obtained through subsequent material removal works with machine tools.

The Applicant has observed that with this method, during the material removal works with machine tools, there is a strong risk of cutting the composite material fibers or of anyhow interrupting their continuity, thus weakening the structure of the composite material and consequently sensibly reducing the mechanical characteristics of the reinforcements themselves.

In order to try to solve this problem, a process for making reinforcements for dental prostheses, wherein the reinforcement structure in the form of a continuous filiform element is manually tied above a preferably metal skeleton, was suggested. The resin, creating the outer shape of the teeth, is then poured onto the reinforcing structure thus created.

The Applicant has noticed that a process such as the latter mentioned, is very slow and strictly connected to the expertise of the operator since it must necessarily be made manually.

The Applicant has thus addressed the problem of implementing a process for making reinforcing structures for dental prostheses in composite material that can be automated, thus quick and not related to the expertise of the operator, and which contemporaneously has integral fibers that were not weakened by material removal works.

SUMMARY OF THE INVENTION

Thus, in a first aspect, the present invention concerns a process for making a reinforcing structure for dental prostheses in continuous fiber composite materials, comprising the steps of:
  a) obtaining a digital three-dimensional model of the patient's palate by means of a three-dimensional scan;
  b) defining an operative outline through an offset of at least one portion of said three-dimensional model;
  c) obtaining a path for at least one height h1 of said three-dimensional model, said path being arranged between the inside of said operative outline (3:3') and said three-dimensional model (2);

d) depositing a continuous filiform element according to said path (9).

Among the advantages of this process, it is especially possible to number the possibility to automate the production process, thus increasing the production speed of the prostheses and loosening the process and product made from the expertise of the operator making it.

Secondly, the process according to the invention allows to prevent damaging the fibers of composite material while producing the prosthesis.

In the aforesaid aspect, the present invention can have at least one of the preferred characteristics described hereunder.

Advantageously, the step of defining an operative outline is implemented through an offset of at least one three-dimensional surface, preferably of all three-dimensional surfaces, of said three-dimensional model.

Alternatively, the step of defining an operative outline is implemented through an offset of a two-dimensional outline of said three-dimensional model.

Preferably, the process further comprises the steps of:

e) intersecting said three-dimensional model or said operative three-dimensional outline with a surface at a height h1 of said three-dimensional model.

Advantageously, the step of intersecting said three-dimensional model with a surface at a height h1 of said three-dimensional model occurs upstream of the offset step and results in the achievement of said operative two-dimensional outline of the three-dimensional model at the height h1.

Conveniently, the process further comprises the step of:

f) discretizing said operative two-dimensional outline in a plurality of adjacent areas and calculating the centroid of each area.

Preferably, the process further comprises the steps of:

g) making a broken line passing inside said operative two-dimensional outline and extending along the whole extent of the operative two-dimensional outline resulting from the union of the centroids of each area;

h) calculating a couple of side paths; the side paths of each couple extending in the same extension direction of said broken line, each side path being spaced from said broken line in the opposite direction with respect to the rest of the couple;

i) joining the two side paths of said couple at the free ends, thus creating a continuous path for the height h1.

Conveniently, the steps b) to i) are repeated for n heights of said three-dimensional model, thus creating continuous paths at different heights of said three-dimensional model.

Advantageously, all continuous paths at different heights of said three-dimensional model are preferably joined, thus creating a single continuous deposition path.

Preferably, the continuous deposition path is discretized by combining a plurality of lying planes, each lying plane being positioned on the deposition path and being oriented through a set of orthogonal Cartesian axes X; Y; Z, wherein the X axis is arranged along the extent of the continuous deposition path and the Z axis is perpendicular to the geometry of said three-dimensional model or of the operative three-dimensional outline.

Conveniently, the molding step comprises the steps of:

feeding a continuous filiform element to a feeding head;

making the feeding head follow the path generated by delivering a continuous filiform element onto a supporting surface;

suddenly melting and cooling and/or polymerizing and/or also partially fixing the continuous filiform element such as to stabilize the composite material in a solid state.

Preferably, the feeding and depositing steps are implemented by exerting a traction force on the continuous filiform element by means of the relative movement between the respective feeding head and a supporting surface.

Moreover, the process can be used in combination with other additive manufacturing technologies such as to reinforce prosthetic apparatuses in which the aesthetic elements, such as gums and teeth, are obtained through digital productive processes.

This allows to make the prosthesis through the deposition of layers of aesthetic material together with the reinforcing material.

Further characteristics and advantages of the invention will become clearer in the detailed description of some preferred, but not exclusive, embodiments of a process for making a reinforcing structure for dental prostheses in continuous fiber composite materials according to the present invention.

BRIEF DESCRIPTION OF THE DRAWINGS

Such description will be set forth hereunder with reference to the accompanying drawings, provided by way of example only and thus not limiting, in which.

DETAILED DESCRIPTION OF EMBODIMENTS OF THE INVENTION

Figure 1:
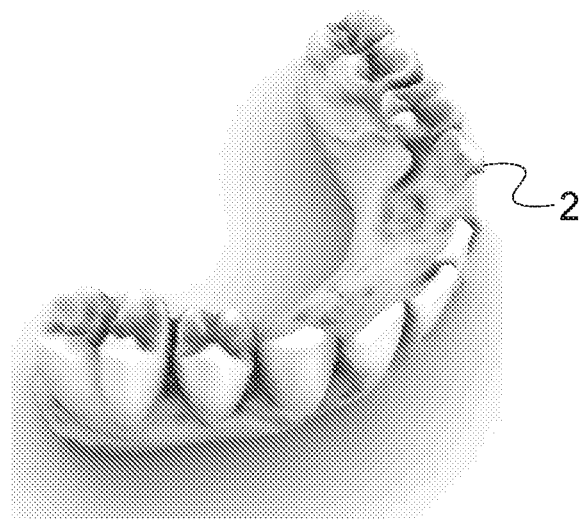
FIG. 1 shows a perspective view of a digital three-dimensional model of a patient's palate.

The process is particularly adapted for being made by molding a reinforcement for dental prostheses in a composite material in the form of a continuous filiform element, the composite material consisting of at least two elements, in particular at least one continuous fiber (or long fiber), which has the task of supporting the fillers; and a matrix, which holds together said at least one fiber, thus protecting it from the outer environment.

Generally, more continuous or long fibers joined to form a continuous filiform element are present.

Other additives and reinforcements can further be present in the composite material used. A number of fibers, appropriately joined together in a step of making the filiform composite material, can be processed such as to constitute an individual body. The fibers can also consist of different materials, among which for example glass fiber, carbon fiber, Kevlar fiber, basalt fiber, natural fibers, etc. The fibers, which must be fed continuously, are preferably collected to form a continuous filiform element.

As far as the matrix is concerned, a resin is used. The resin can be a thermosetting resin, for example an epoxy, acrylic, polyester resin, etc.

Alternatively, the resin can be a thermoplastic resin such as for example peek, nylon, polyethylene.

The equipment needed to mold a reinforcement for dental prostheses in a composite material comprises a feeding head for feeding a continuous filiform element comprising at least one continuous fiber (or long fiber), a movement assembly for the relative movement between the feeding head and the three-dimensional reinforcement 20 to be molded, such as to exert a traction of the continuous filiform element, a power source configured to induce a phase change of at least one portion of the continuous filiform element from the solid state to the liquid state.

The feeding head is advantageously supported by a movement assembly for the relative movement between the same feeding head 1 and the three-dimensional reinforcement 20 to be molded.

While the continuous filiform element is being fed, the movement assembly exerts a traction force onto the filiform element and thus also on the continuous fibers contained therein.

In other words, the relative movement between the feeding head 1 and the reinforcement 20 determines a traction action on the material during the respective deposition.

Consequently, this traction force is also transferred to the continuous fibers.

The movement means comprise at least one machine numerically controlled moved on at least three axes.

According to a first embodiment not shown in the figures, the numerical control machine comprises a motorized arm to support the feeding head mentioned above at a respective end portion.

The motorized arm, which is neither described nor shown in detail since of the known type, is adapted to move the head in the three spatial axes, by orienting the feeding head according to any position with respect to the three-dimensional reinforcement 20 and with respect to a supporting surface on which the object 20 is positioned during the molding process.

Upstream of the real molding step, the process has a step wherein a digital three-dimensional model 2 of the patient's palate is obtained by means of a three-dimensional scan of the palate itself.

For this purpose, any direct or indirect three-dimensional scanning technology can be used on a physical duplicate of the palate.

A direct digital three-dimensional scan of the physical palate of a patient is in fact shown in FIG. 1.

Figure 3:
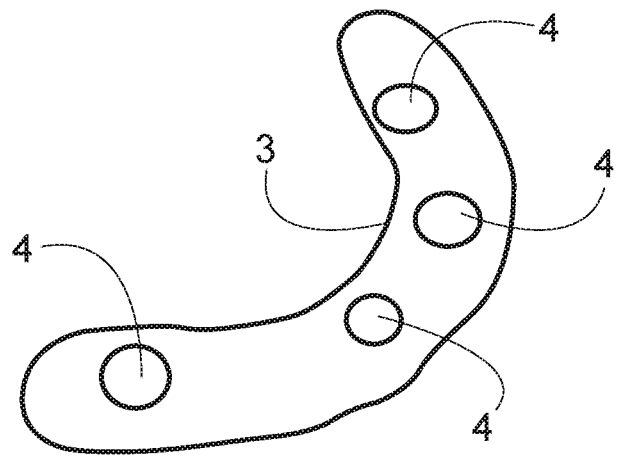
FIG. 3 shows a schematic view of the outline made in FIG. 2.

According to a first embodiment, at this stage, a representation of an operative two-dimensional outline 3, shown in FIG. 3 and achieved by intersecting the three-dimensional model 2 with a surface at a height h1 of the three-dimensional model itself, is obtained from the three-dimensional digital model 2 of the patient's palate, such as to achieve a first two-dimensional outline of the three-dimensional model and from a successive offset towards the inside of the two-dimensional outline just achieved.

Figure 2:
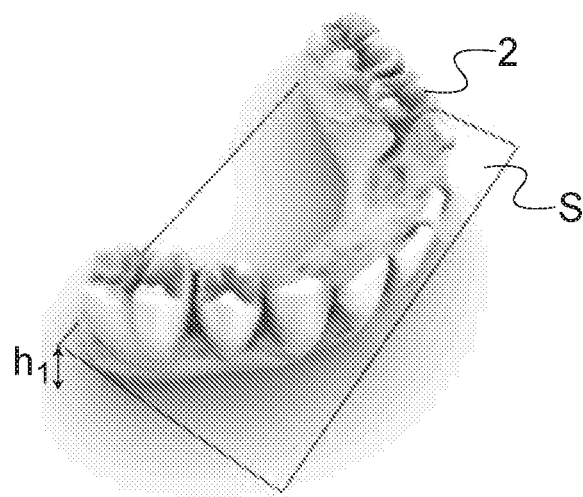
FIG. 2 shows a perspective view of the three-dimensional model of FIG. 1, intersected by a plane s to make a two-dimensional outline thereof.

An operative two-dimensional outline 3, obtained by intersecting a plane s with the three-dimensional model 2 at a height h1, with respect to the leaning plane of the base of the model 2 and from a successive offset towards the inside, is in fact shown in FIG. 2.

The operative two-dimensional outline 3 is not necessarily achieved by intersecting the model with a plane s, but could be achieved by intersecting it with a different surface, for example a curve, without thereby departing from the protection scope of the present invention.

In FIG. 3, the operative two-dimensional outline 3 achieved internally shows the hooking points for hooking to the cores of the dental prostheses. The hooking points are depicted in the operative two-dimensional outline 3 by four hooking circumferences 4.

Thus, the operative two-dimensional outline 3 achieved is discretized in a plurality of adjacent areas 5 and the centroid 6 of each area 5 is calculated.

Figure 4:
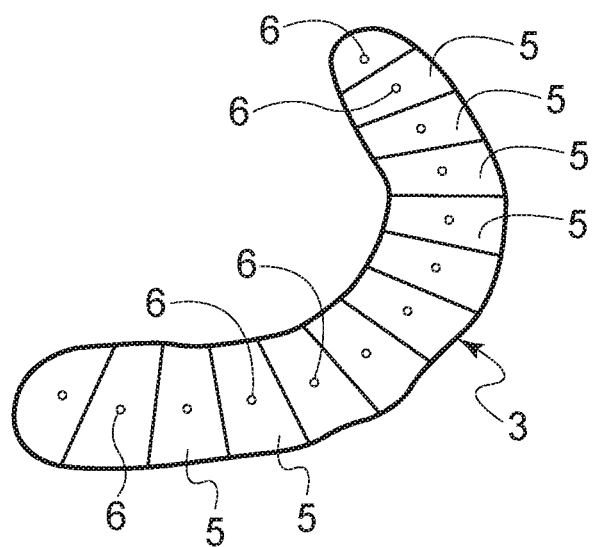
FIG. 4 shows a schematic view of the outline of FIG. 3, discretized in a succession of small areas.

The operative two-dimensional outline 3 achieved at height h1, divided into a succession of areas 5 for each of which the centroid 6 was found, is shown in FIG. 4.

Figure 5:
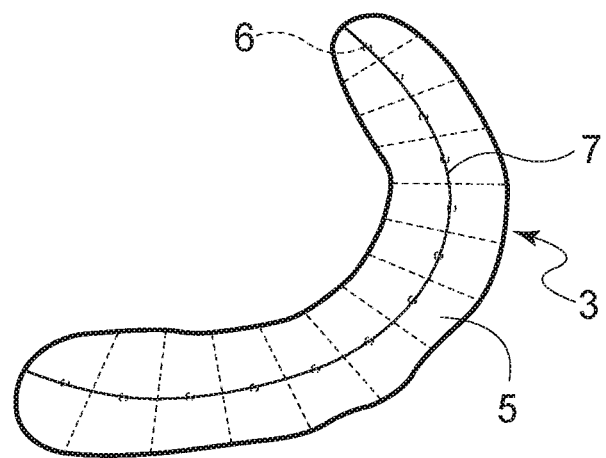
FIG. 5 shows a schematic view of the step of obtaining a broken line resulting from the union of the centroids of the areas obtained from the discretization process of FIG. 4.
Figure 6:
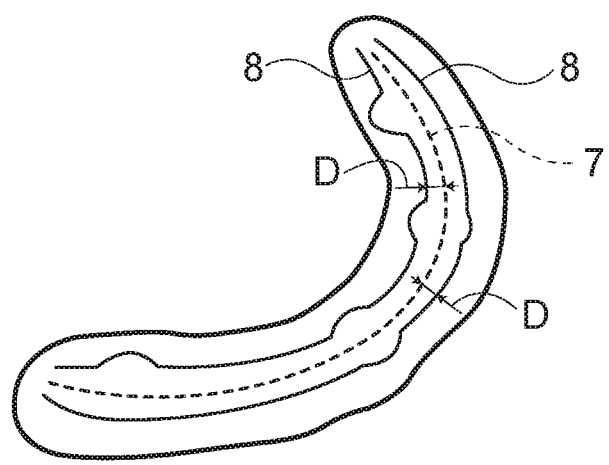
FIG. 6 shows a schematic view of the step of obtaining a couple of side paths deriving from the broken line obtained in the step shown in FIG. 5.

A broken line 7 is thus achieved by joining all centroids 6 of the respective areas 5, as shown in FIG. 5.

At this point, a couple of side paths 8 is calculated and represented. In particular, a couple of side paths 8 for each operative two-dimensional outline 3.

Each side path 8 of the couple extending in the same extension direction of the broken line 7, but being spaced from the latter at a given distance D.

The side paths 8 of each couple being spaced from the broken line 7 in the opposite direction. In other words, each side path 8 is spaced from the broken line 7 but in the direction opposite the remaining side path 8, such as a side path 8 is more inward and the other more outward once the dental prosthesis is formed.

Each path 8 can be spaced at a specific distance D with respect to the broken line 7. In other words, the side paths 8 of a same couple are not necessarily spaced at the same distance D with respect to the broken line 7.

In each path, the spacing distance from the broken line 7 varies along the extension of the path 7. In detail, at some positions of the path, the distance from the broken line 7 is greater, such as for example at the hooking circumferences 4 for hooking to the cores of the dental prosthesis.

Each distance D must anyhow be less than the distance between the broken line 7 and the operative two-dimensional outline 3.

The distance D of each path 8 from the broken line 7 is modified according to some input parameters which keep the minimum distance into account with respect to critical points of the prosthesis, for example the hooking circumferences 4, and according to the stresses to which the prosthesis will be subjected during the chewing cycles.

Figure 7:
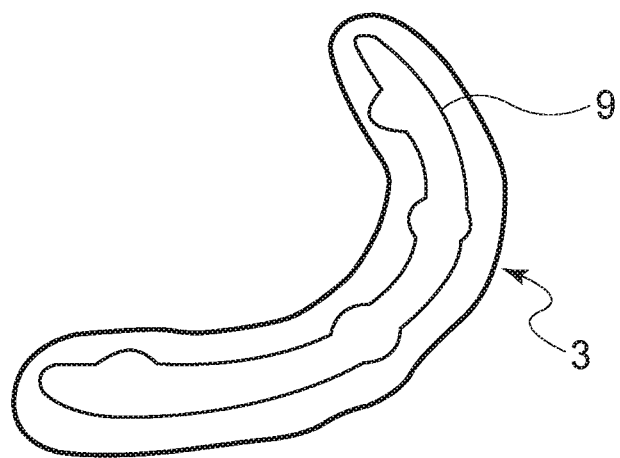
FIG. 7 shows a schematic view of the continuous path resulting from the union of the side paths obtained in FIG. 6.

The two side paths 8 of each couple are thus jointed at their ends such as to create a single path 9 for the height h1, as shown in FIG. 7.

The steps described above are repeated for different heights h of the three-dimensional model 2, such as to have a single path 9 associated with the height of the three-dimensional model 2.

A series of single paths 9, one for each height h of the three-dimensional model 2, are thus achieved.

Figure 8:
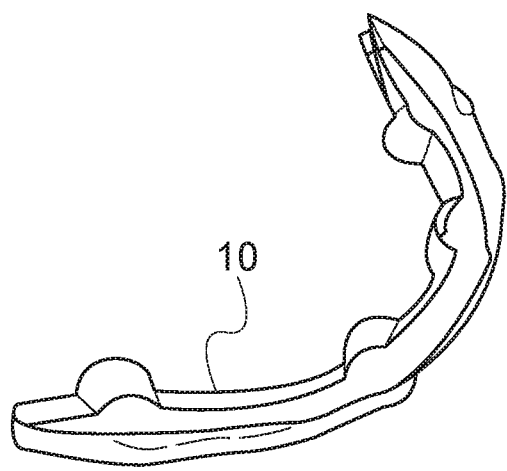
FIG. 8 shows a schematic view of the continuous deposition path.

At this point, all single paths 9, each made at a different height, are joined thus creating a continuous deposition path 10 depicted in FIG. 8.

The continuous deposition path 10 is discretized by combining a plurality of lying planes, not shown in the figures, each plane being positioned on the deposition path and being oriented through a set of orthogonal Cartesian axes X; Y; Z, wherein the X axis is arranged along the extent of the continuous deposition path 10, the Z axis being perpendicular to the geometry of the initial three-dimensional model 2.

This way, the coming out of the continuous filiform element from the molding tool (the feeding head) is favored.

Figure 9:
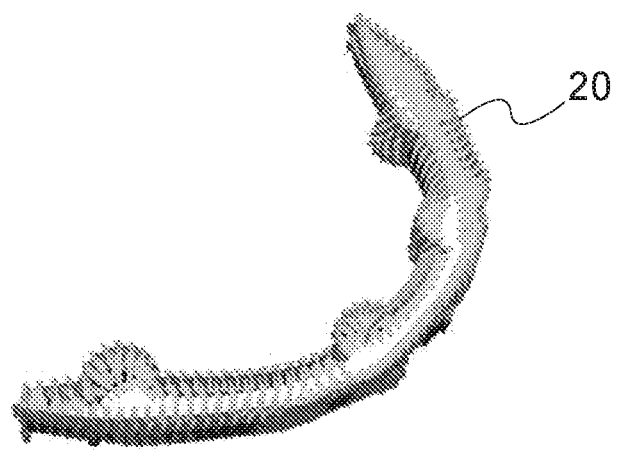
FIG. 9 shows a schematic view of a reinforcing structure for dental prostheses, which is made with the process according to the invention.

Once the coordinates of the succession of lying planes has been transformed into machine language, it is thus possible to deposit a continuous filiform element according to the continuous deposition path 10, such as to make the reinforcing structure for dental prostheses 20 schematically shown in FIG. 9.

In detail, one proceeds by depositing a continuous filiform element according to the set of coordinates of the succession of lying planes.

The deposition step comprises a step of feeding a continuous filiform element to a feeding head, which is supported by a movement assembly for the relative movement between the same feeding head 1 and the three-dimensional reinforcement 20 to be molded. The movement assembly being represented by at least one machine numerically controlled moved on at least three axes.

The feeding head is thus made to follow the continuous deposition path 10, by contemporaneously delivering the continuous filiform element onto a supporting surface such as it is deposited according to the continuous deposition path 10.

The supporting surface can be a flat surface, but also a curved surface represented by a portion of a reinforcing structure or prosthesis, also partial, achieved with an additive manufacturing method, for example SLA or DLP.

At this point, the continuous filiform element is suddenly melted and cooled and/or polymerized such as to stabilize the composite material into a solid state, if used in combination with other additive manufacturing processes, such as (SLA or DLP), the polymerization of the composite material can occur during the stratification of the successive layer.

Figure 10:
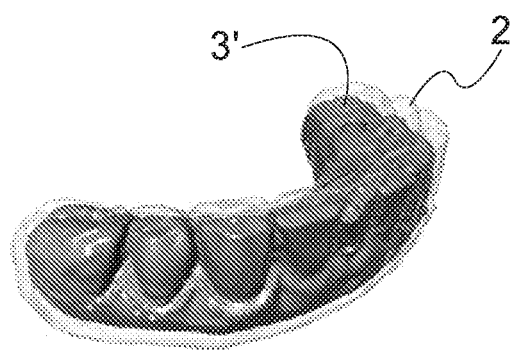
FIG. 10 shows a perspective view of a second digital three-dimensional model of a patient's palate, also named operative three-dimensional outline, achieved through an offset of the three-dimensional model of FIG. 1.

According to another embodiment, a representation of an operative three-dimensional outline 3', shown in FIG. 10, is obtained from the digital three-dimensional model 2 of the patient's palate.

An offset, preferably of all surfaces of the three-dimensional model 2 towards its inside, as shown in FIG. 10, is carried out to achieve the operative three-dimensional outline 3'.

Once a second three-dimensional model (operative three-dimensional outline 3') is achieved more compact in size and comprised inside the first one, an intersection with a plane is carried out at a height h1 of the operative three-dimensional outline 3' itself, such as to achieve an operative two-dimensional outline 3.

At this point, the process starts over and proceeds as in the preceding case with the discretizing of the operative two-dimensional outline 3 in a plurality of adjacent areas 5 and by calculating the centroid 6 of each area 5 and so forth.

Several changes can be made to the embodiments described in detail, all anyhow remaining within the protection scope of the invention, defined by the following claims.

The invention claimed is:

1. A process for making a reinforcing structure for dental prostheses in continuous fiber composite materials, comprising the steps of:
    a) obtaining a digital three-dimensional model of a patient's palate by means of a three-dimensional scan;
    b) generating a two-dimensional operative outline by inwardly offsetting at least one portion of said three-dimensional model,
    c) defining a two-dimensional path at a height location of said three-dimensional model, said two-dimensional path being internal to said two-dimensional operative outline;
    d) repeating said step c) at a plurality of said height locations of said three dimensional model to form a plurality of said two-dimensional paths at said corresponding plurality of height locations; and
    e) depositing a continuous filiform element onto a supporting surface to form said reinforcing structure by depositing said filiform material along each said two-dimensional path at each said corresponding height location over said supporting surface using a movable feeding head.

2. The process according to claim 1, wherein the step of generating a two-dimensional operative outline is implemented through an offset of at least one three-dimensional surface of said three-dimensional model.

3. The process according to claim 1, wherein the step of generating a two-dimensional operative outline is implemented through an offset of a two-dimensional outline of said three-dimensional model.

4. The process according to claim 1 further comprising a step of: f) intersecting said three-dimensional model with a surface at a height h1 of said three-dimensional model.

5. The process according to claim 4, wherein the step f) of intersecting said three-dimensional model with a surface at a height h1 of said three-dimensional model occurs prior to the generating step and results in said operative two-dimensional outline of the three-dimensional model at the height h1.

6. The process according to claim 5, further comprising the step of: g) discretizing said operative two-dimensional outline in a plurality of adjacent areas and calculating the centroid of each area.

7. The process according to claim 6, further comprising the steps of:
    h) making a broken line passing inside said operative two-dimensional outline and extending along the whole extent of the operative two-dimensional outline resulting from the union of the centroids of each area;
    i) calculating a couple of side paths, the side paths of each couple extending in the same extension direction of said broken line, each side path being spaced from said broken line in the opposite direction with respect to the rest of the couple; and
    j) joining the two side paths of said couple at the free ends, thus creating a continuous path for the height h1.

8. The process according to claim 7, wherein the steps b) to j) are repeated for n heights of said three-dimensional model, thus creating continuous paths at different heights of said three-dimensional model.

9. The process according to claim 8, wherein each of said continuous paths at different heights of said three-dimensional model are joined to create a single continuous deposition path.

10. The process according to claim 9, wherein said single continuous deposition path is discretized by combining a plurality of lying planes, each lying plane being positioned on the single continuous deposition path and being oriented through a set of orthogonal Cartesian axes X; Y; Z, wherein the X axis is arranged along the extent of the continuous deposition path and the Z axis is perpendicular to the geometry of said three-dimensional model.

11. The process according to claim 1, further comprising a molding step that comprises the steps of:
   feeding the continuous filiform element to a feeding head;
   making the feeding head follow the plurality of two-dimensional paths thus delivering said continuous filiform element onto said supporting surface; and
   suddenly melting and cooling and/or polymerizing the continuous filiform element to stabilize composite material of the deposited continuous filiform element in a solid state.

12. The process according to claim 1, wherein the at least one portion of said three-dimensional model is a lowermost base portion of said model.

13. The process according to claim 1, wherein said step c) comprises defining said two-dimensional path at a height location of said three-dimensional model, said two-dimensional path being arranged between said two-dimensional offset operative outline and said three-dimensional model.

14. The process according to claim 1, further comprising a molding step comprising feeding the continuous filiform element to the movable feeding head within a movement assembly and wherein the movement assembly exerts a traction force on the filiform element.

15. The process according to claim 1, further comprising suddenly melting and cooling the continuous filiform element after said step e) of depositing, to stabilize the composite material of the deposited continuous filiform element in a solid state.

16. A process for making a reinforcing structure for dental prostheses in continuous fiber composite materials, comprising the steps of:
   a) obtaining a digital three-dimensional model of a patient's palate by means of a three-dimensional scan;
   b) generating a two-dimensional operative outline by inwardly offsetting at least one portion of said three-dimensional model,
   c) defining a path at a height location of said three-dimensional model, said path being internal to said two-dimensional operative outline;
   d) repeating said step c) at a plurality of said height locations of said three-dimensional model to form a plurality of paths at said corresponding plurality of height locations;
   e) depositing a continuous filiform element onto a supporting surface to form said reinforcing structure by depositing said filiform material along each said path at each said corresponding height location over said supporting surface, wherein said depositing comprises the steps of:
   f) feeding the continuous filiform element to a movable feeding head;
   g) causing the movable feeding head follow each of the plurality of paths thus delivering said continuous filiform element onto said supporting surface; and
   h) suddenly melting and cooling and/or polymerizing the continuous filiform element to stabilize composite material of the deposited continuous filiform element in a solid state.

* * * * *